US010641697B2

(12) United States Patent
Couderc

(10) Patent No.: US 10,641,697 B2
(45) Date of Patent: May 5, 2020

(54) DEVICE FOR COUNTING PARTICLES

(71) Applicant: HORIBA ABX SAS, Montpellier (FR)

(72) Inventor: Guilhem Couderc, St. Jean de Védas (FR)

(73) Assignee: HORIBA ABX SAS, Montpellier (FR)

( * ) Notice: Subject to any disclaimer, the term of this patent is extended or adjusted under 35 U.S.C. 154(b) by 351 days.

(21) Appl. No.: 15/563,427

(22) PCT Filed: Apr. 1, 2016

(86) PCT No.: PCT/FR2016/050738
§ 371 (c)(1),
(2) Date: Sep. 29, 2017

(87) PCT Pub. No.: WO2016/156751
PCT Pub. Date: Oct. 6, 2016

(65) Prior Publication Data
US 2018/0088020 A1    Mar. 29, 2018

(30) Foreign Application Priority Data

Apr. 2, 2015   (FR) ...................................... 15 52874

(51) Int. Cl.
*G01N 15/12*   (2006.01)
*G01N 15/10*   (2006.01)

(52) U.S. Cl.
CPC . *G01N 15/1227* (2013.01); *G01N 2015/1062* (2013.01)

(58) Field of Classification Search
None
See application file for complete search history.

(56) References Cited

U.S. PATENT DOCUMENTS

| | | | |
|---|---|---|---|
| 3,557,352 | A | 1/1971 | Hogg et al. |
| 3,893,767 | A | 7/1975 | Fulwyler et al. |
| 3,936,739 | A | 2/1976 | Hogg |
| 4,110,604 | A | 8/1978 | Haynes et al. |
| 4,303,337 | A | 12/1981 | James et al. |
| 2001/0032495 | A1 | 10/2001 | Ueno et al. |

(Continued)

FOREIGN PATENT DOCUMENTS

| | | |
|---|---|---|
| CN | 201034915 Y | 3/2008 |
| CN | 101344475 A | 1/2009 |

(Continued)

OTHER PUBLICATIONS

International Search Report issued in International Patent Application No. PCT/FR2016/050738, dated Sep. 19, 2016 (6 pages).

*Primary Examiner* — Roy Y Yi
(74) *Attorney, Agent, or Firm* — Arent Fox LLP

(57) ABSTRACT

A device for counting particles comprises a detector arranged to produce an electrical measurement signal in response to the passage of one or more particles, and a comparator arranged to compare the measurement signal with a threshold signal and to increment a counting value when the measurement signal exceeds the threshold signal, characterized in that it furthermore comprises a threshold-adjusting circuit that applies a lowpass filter to the measurement signal, and that is connected to the comparator in order to use the resulting signal as threshold signal.

8 Claims, 2 Drawing Sheets

(56) References Cited

U.S. PATENT DOCUMENTS

2009/0072873 A1* 3/2009 Denier ................... H03K 5/003
                                                                     327/175
2014/0252226 A1* 9/2014 Statham ............... G01N 23/203
                                                                     250/307

FOREIGN PATENT DOCUMENTS

| CN | 101344521 A | 1/2009 |
|----|-------------|--------|
| CN | 101750273 A | 6/2010 |
| CN | 102177427 A | 9/2011 |
| CN | 203414390 U | 1/2014 |
| DE | 2448303 A1 | 4/1975 |
| FR | 2260834 A1 | 9/1975 |
| GB | 1445703 A | 8/1976 |
| JP | S50061077 U | 6/1975 |
| JP | S58050450 A | 3/1983 |
| JP | S61107137 A | 5/1986 |
| JP | H02503351 | 10/1990 |

* cited by examiner

DEVICE FOR COUNTING PARTICLES

CROSS REFERENCE TO RELATED APPLICATIONS

This application is a 35 U.S.C. 371 National Phase of PCT Application No. PCT/FR2016/050738 filed Apr. 1, 2016, which claims benefit to FR Application No. 1552874 filed Apr. 2, 2015, the disclosure of which is hereby incorporated by reference in its entirety.

FIELD OF INVENTION

The invention relates to the counting of particles in-flow and in suspension in a fluid, in particular for flow cytometry and hematology.

BACKGROUND

One of the counting techniques used in flow cytometry relies on the measurement of the variation in impedance in a measuring zone when one or more particles are guided therethrough in-flow, this technique being referred to as the Coulter technique. The number of impedance changes indicates the number of particles whereas the measured impedance value is proportional to the volume of the particle. The counting method currently used in cytometry in conventional instruments is based on the detection of events of amplitude higher than a threshold. Each threshold crossing corresponds to one event. The Coulter technique may be used to count endogenous or exogenous particles such as cells, vesicles, parasites, beads, viruses, pollutants, or even toxins.

The main drawback of the principle of this counting technique is the lack of resolution in the presence of a high number of events. In this case, two or more events may coincide and not be distinguishable from one another. Specifically, two or more particles may pass more or less simultaneously through the measuring zone and thus interact together, this also having an effect on the measured impedance. When the number of particles to be counted greatly increases these coincidences become increasingly frequent, and detection may be limited by the resolution of the sensor.

In the presence of a very high number of events, the coincidence becomes such that the measured signal almost no longer drops below the threshold level. Thus, beyond a certain number, the increase in the frequency of the events translates into a decrease in the count. In order to prevent measurements that are completely corrupted by this saturation effect from being returned, an alarm system based on an indicator such as the occupation time of the sensor is provided in order to indicate the existence of a saturation of the sensor.

To compensate for events not detected because of coincidences, a correction of the count based on measurement of occupation time is possible.

Coincidence correction or linearization consists in extrapolating the number of real events from the counted events. The effect of this extrapolation increases with the number of events, having the consequence of increasing count uncertainty.

Linearization methods are based on extrapolation. They are therefore complex to implement, require a specific calibration for each machine produced, and pose verification problems.

The need to substantially correct the number of events counted increases with the number of particles to be counted, the result of this being to increase the uncertainty in the performed measurements. In the case where the sensor is saturated, the uncertainty in the result is too high to be corrected.

The invention aims to improve the situation. To this end, the invention provides a device for counting particles comprising a detector arranged to produce an electrical measurement signal in response to the passage of one or more particles, and a comparator arranged to compare the measurement signal with a threshold signal and to increment a counting value when the measurement signal exceeds the threshold signal. This device comprises a threshold-adjusting circuit that applies a lowpass filter to the measurement signal, and that is connected to the comparator in order to use the resulting signal as threshold signal.

This device is advantageous because the threshold signal is able to move as a function of the detected signal. Thus, when the detected signal increases because of the detection of many passages, the detection threshold also increases. This improves the resolution of the device and allows fewer counts to be lost.

SUMMARY OF VARIOUS EMBODIMENTS

In various particular embodiments, the device may have one or a combination of a number of the following features:
  the comparator and the adjusting circuit are produced analogously, the adjusting circuit comprising a resistor and a capacitor mounted in series, and the comparator being an operational amplifier in comparator mode one input of which receives the measurement signal, and the other input of which is connected to the adjusting circuit between the resistor and the capacitor;
  the comparator is mounted between at least two hysteresis resistors;
  the device furthermore comprises an analogue-digital converter for digitizing the measurement signal, and the comparator and the threshold-adjusting circuit are produced in digital form;
  the threshold-adjusting circuit is a finite-impulse-response filter of order 1;
  the device furthermore comprises a circuit ensuring the threshold signal has a minimum value;
  the device comprises an operational amplifier mounted in follower mode between its output and its positive input, a voltage source connected to its negative input, and a diode between the output of the operational amplifier and the threshold-adjusting circuit;
  the device furthermore comprises a triggering circuit comprising an operational amplifier mounted in comparator mode one input of which receives the measurement signal, and the other input of which is connected to the voltage source; and
  the measurement signal is produced according to the Coulter principle, and the cut-off frequency of the lowpass filter is lower than 200 Hz.

The invention also proposes a method for counting particles comprising the following operations:
a) producing a measurement signal in response to the detection of the passage of one or more particles by a detector;
b) producing a mobile threshold signal by applying a lowpass filter of chosen frequency to the signal generated in operation a); and
c) comparing the measurement signal and the mobile threshold signal and emitting a signal indicating the detection of a particle when the measurement signal exceeds the mobile threshold signal by a chosen amount.

DETAILED DESCRIPTION OF VARIOUS EMBODIMENTS

Other features and advantages of the invention will become more clearly apparent on reading the following description, which is drawn from nonlimiting examples given by way of illustration, which are drawn from the drawings

The drawings and the description below contain, for the most part, elements of certain character. They will therefore possibly not only serve to better understand the present invention, but also contribute to its definition, where appropriate.

Figure 1:
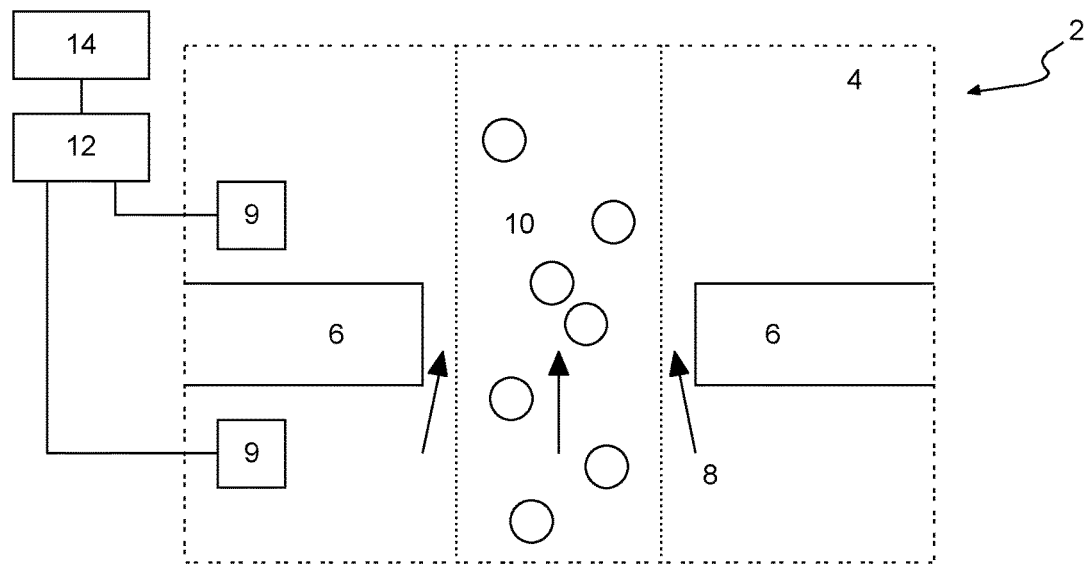
FIG. 1 shows a schematic diagram of a portion of a device according to the invention.

FIG. 1 shows a counting device 2 according to the invention. The device 2 is considered in the following to be dedicated to the inspection (or analysis) of a fluid taking the form of a hematological sample, with a view to counting blood cells. However, the invention is limited neither to this type of fluid, nor to impedance-based counting. Specifically, it relates to any type of fluid, to any type of in-flow counter, and in particular to in-flow cytometers. It will possibly also be used to count beads or any other particles.

As is illustrated in FIG. 1, the device 2 according to the invention firstly includes a measurement cuvette 4, of the hydrodynamically focused type, such as for example the measurement cuvette described in patent document FR 2 653 885. It will be understood that the device may not be of hydrodynamically focused type.

To simplify, such a cuvette 4 includes an internal wall in which is placed a focusing nozzle 6, generally made of sapphire and defining a calibrated orifice, in the example described here of 60 μm diameter. The wall defines an internal housing 8 in which a capillary tube (not shown) is placed, and the end of which is located facing the nozzle 6 at a small distance therefrom. This capillary tube it is intended to transport the fluid to be inspected upstream of the nozzle 6, in order to allow it to be channeled thereto, in the form of a primary flow 10, by a secondary sheathing fluid flowing through said internal housing 8 around the capillary.

This embodiment allows the sample containing the blood cells injected into a so-called measurement region or zone to be hydrodynamically sheathed. FIG. 1, with the nozzle 6, is a close-up view of the device level with this measurement zone. In the example described here, the analyzed primary flow 10 is prepared blood, which flows through the channel 2 in the direction designated by an arrow in FIG. 1.

A detector 12 is connected to the cuvette 4 level with the nozzle 6, and comprises a current source so that an electrical current passes through the nozzle 6. In the absence of cells, the primary flow 10 and the sheathing fluid define a load impedance that is measured by two electrodes 9 placed on either side of the nozzle 6. When the primary flow 10 contains a blood cell the latter leads to an impedance increase. This impedance variation on the one hand allows the volume of the cell to be determined (qualitative measurement), and on the other hand allows a cell count to be made (quantitative measurement). The detector 12 therefore forms a detector that produces an electrical signal in response to the passage of one or more particles. The detector 12 may comprise an amplifier and filters in order to produce a measurement signal that is exploitable by the electronic circuit 14.

The detector 12 sends an electrical signal that reflects the impedance measured level with the nozzle 6 to an electronic circuit 14. The role of the electronic circuit 14 is to perform cell measurement on the basis of the signal sent by the detector 12.

The electronic circuit 14 will now be described with reference to FIG. 2.

The electronic circuit 14 comprises two sections:
  a threshold-adjusting circuit 50 comprising a resistor 52 and a capacitor 54; and
  a comparator 56.

The threshold-adjusting circuit 50, which consists of the resistor 52 and the capacitor 54 placed in series, forms a lowpass filter. It is directly connected to the detector 12 on the side of the resistor 52 and to ground on the side of the capacitor 54. In the example described here, the resistor 52 has a resistance of 6 kΩ, and the capacitor 54 has a capacitance of 1 nF, i.e. the cut-off frequency is 166.67 Hz. The value of the cut-off frequency is calculated to obtain a compromise between resolution of coincident passages and immunity to noise and other effects such as the deformation due to edge passages in the case of measurement in-flow without hydrodynamic focusing. Tests carried out by the Applicant have shown that a variation of 10% in the value of RC results in a variation of 0.6% in the number of cells counted and therefore in a high tolerance to commercial components.

In the example described here, the comparator 56 is a TLE2071 operational amplifier as sold by Texas Instruments (registered trademark). The negative input of the comparator 56 is connected to the adjusting circuit 50 between the resistor 52 and the capacitor 54. Study of the threshold-adjusting circuit 50 has shown that the voltage S(t) on the negative input of the comparator 56 is related to the measurement signal M(t) generated by the detector 12 by the following relationship:

$$M(t) = RC\frac{dS(t)}{dt} + S(t)$$

or, discretely:

$$M(n) = \tau\frac{S(n) - S(n-1)}{dt} + S(n)$$

The operational amplifier is thus mounted in comparator mode, so that it emits on its output a positive voltage if the measurement signal M(t) generated by the detector 12 is higher than the threshold signal S(t) generated by the threshold-adjusting circuit 50, and 0 if not.

By virtue of this electronic arrangement, the mobile threshold signal "follows" the value of the measurement signal. Thus, when a plurality of cells simultaneously pass the exit of the nozzle 6, even with the increase in the measurement signal, the device preserves an excellent resolution because the threshold signal remains close to the measurement signal, without preventing detection.

Above, an in-flow cytometry device allowing quantitative measurements to be made was described. FIG. 3 shows a variant embodiment that is more sophisticated than the embodiment of FIG. 2, and which may for example be used in a particle-counting device furthermore allowing a qualitative measurement to be carried out.

The electronic circuit 14 comprises, in this embodiment, four sections:
- a threshold-adjusting circuit 50 comprising a resistor 52 and a capacitor 54;
- a comparator 56 surrounded by two resistors 58 and 60, for the mobile-threshold counting;
- a comparator 62 surrounded by two resistors 64 and 66, for the qualitative measurements; and
- a comparator 68 coupled to a diode 70 and to a voltage source 72.

The threshold-adjusting circuit 50 comprising the resistor 52 and the capacitor 54, which resistor and capacitor are placed in series, forms a lowpass filter. It is directly connected to the detector 12 on the side of the resistor 52, and to ground on the side of the capacitor 54. As for the embodiment of FIG. 2, the resistor 52 has a resistance of 6 kΩ, and the capacitor 54 has a capacitance of 1 nF, i.e. the cut-off frequency is 166.67 Hz.

The output of the comparator 56 is looped back on its positive input, and the resistor 64 is connected on the one hand to this positive input and on the other hand to the detector 12. The resistor 66 is connected in series in the loop. The negative input of the comparator 56 is connected to the threshold-adjusting circuit 50 between the resistor 52 and the capacitor 54.

In the example described here, the resistor 64 has a resistance of 22 kΩ, and the resistor 66 has a resistance of 1 MΩ. Together the resistors 64 and 66 set a hysteresis of 110 mV for the comparator 56 in the example described here for an output voltage limited to 5 V. This hysteresis allows immunity to noise when the signal crosses the fixed threshold or mobile threshold.

In the example described here, the comparator 62 is identical to the comparator 56, and the resistors 64 and 66 are identical to the resistors 58 and 60. The positive input of the comparator 62 receives the measurement signal of the detector 12, whereas the negative input is connected to the voltage source 72. As the comparator 62 is mounted in comparator mode, it emits a positive output voltage if the measurement signal is higher than the value of the voltage source 72, and 0 if not. Thus, the output of the comparator 62 may be used to perform qualitative measurements on the basis of the signal emitted by the detector 12, or even to control the triggering of a light source for a downstream measurement when the detector 12 detects the passage of a cell.

In the example described here, the comparator 68 is identical to the comparator 56, and its output is connected to the diode 70, which is connected to the positive input of the comparator 56, whereas the voltage source 68 is connected to the negative input of the comparator 68. The diode 70 is mounted in order to let current pass only from the comparator 68, and is connected to the threshold-adjusting circuit 50 between the resistor 52 and the capacitor 54. Thus, this section ensures that the threshold signal S(t) cannot drop below a value set by the voltage source 72. In the example, this value is that of the fixed threshold voltage for triggering conventional counting or qualitative measurement.

Figure 2:
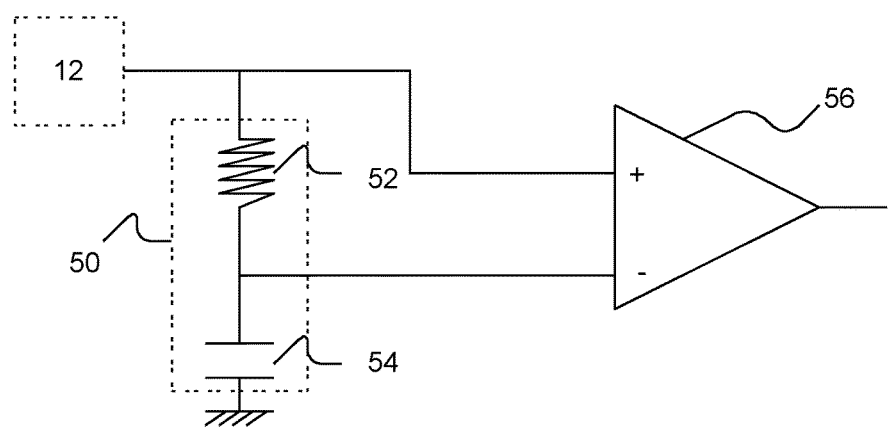
FIG. 2 shows a circuit diagram of an element of FIG. 1.
Figure 3:
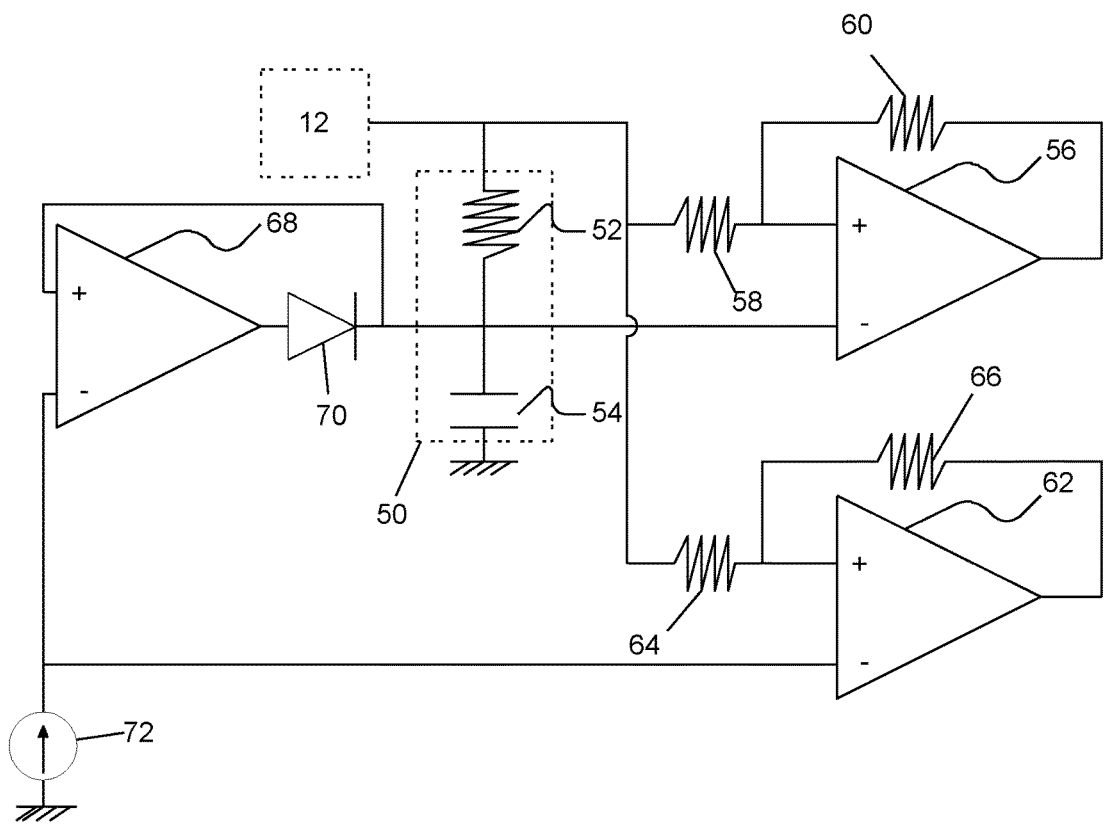
FIG. 3 shows a circuit diagram of a variant of FIG. 2.

The two embodiments described in FIGS. 2 and 3 could be combined. Thus, the section intended to guarantee a threshold-signal value higher than that of the fixed threshold and the hysteresis resistors could nevertheless be included separately or together in the embodiment in FIG. 2; likewise they could be removed together or separately from the embodiment of FIG. 3.

Above, the electronic circuit 14 was described as being an analogue device. As a variant, the device may comprise an analogue-digital converter that receives the measurement signal from the detector 12, the adjusting circuit 50 then being made up of a digital finite-impulse-response filter of order 1 and a digital comparator of the measured signal and the threshold signal output by the filter.

This type of filter obeys the following equation:

$$S(n)=kM(n)+(1-k)S(n-1)$$

In order to decrease the required resources, the coefficient k of the digital filter is chosen to be a power of 2, or its inverse. Thus, multiplication is achieved by a logic shift to the left or right. This method limits the possible values of the cut-off frequency of the filter, but it has the advantage of being easy to implement.

The invention claimed is:

1. A device for counting particles comprising
a detector arranged to produce an electrical measurement signal in response to the passage of one or more particles,
a comparator arranged to compare the measurement signal with a threshold signal and to increment a counting value when the measurement signal exceeds the threshold signal, wherein the comparator is mounted between at least two hysteresis resistors, and
a threshold-adjusting circuit that applies a lowpass filter to the measurement signal, and that is connected to the comparator in order to use the resulting signal as threshold signal.

2. The device of claim 1, wherein the threshold-adjusting circuit comprises a resistor and a capacitor mounted in series, and the comparator being an operational amplifier in comparator mode one input of which receives the measurement signal, and the other input of which is connected to the threshold-adjusting circuit between the resistor and the capacitor.

3. The device of claim 1, furthermore comprising an analogue-digital converter for digitizing the measurement signal, and wherein the comparator and the threshold-adjusting circuit are produced in digital form.

4. The device of claim 3, wherein the threshold-adjusting circuit is a finite-impulse-response filter of order 1.

5. The device of claim 1, further comprising a circuit ensuring the threshold signal has a minimum value.

6. The device of claim 5, comprising an operational amplifier mounted in follower mode between its output and its positive input, a voltage source connected to its negative input, and a diode between the output of the operational amplifier and the threshold-adjusting circuit.

7. The device of claim 6, further comprising a triggering circuit comprising an operational amplifier mounted in comparator mode one input of which receives the measurement signal, and the other input of which is connected to the voltage source.

8. A method for counting particles comprising:
a) producing a measurement signal in response to the detection of the passage of one or more particles by a detector;
b) producing a mobile threshold signal by applying a lowpass filter of chosen frequency to the signal generated in a); and c) comparing the measurement signal and the mobile threshold signal and emitting a signal indicating the detection of a particle when the measurement signal exceeds the mobile threshold signal by a chosen amount, wherein the measurement signal is produced according to the Coulter principle, and wherein the cut-off frequency of the lowpass filter is lower than 200 Hz.

* * * * *